United States Patent [19]

Perkinson et al.

[11] 4,224,477
[45] Sep. 23, 1980

[54] ARRANGEMENT FOR TRANSLATING TELEPHONE STATION EQUIPMENT NUMBERS INTO DIRECTORY NUMBERS

[75] Inventors: William B. Perkinson, Colts Neck, N.J.; Ray K. Zies, Reynoldsburg, Ohio

[73] Assignee: Bell Telephone Laboratories, Incorporated, Murray Hill, N.J.

[21] Appl. No.: 941,267

[22] Filed: Sep. 11, 1978

[51] Int. Cl.$^2$ .......................... H04Q 3/47; H04Q 3/70
[52] U.S. Cl. .......................... 179/18 ET; 179/18 DA; 179/18 FH
[58] Field of Search ........ 179/18 DA, 18 ET, 18 FH, 179/175.2 C, 175.2 R

[56] References Cited

U.S. PATENT DOCUMENTS

| | | | |
|---|---|---|---|
| 2,981,806 | 4/1961 | Middaugh | 179/175.2 C |
| 3,170,041 | 10/1962 | Spellnes | 179/18 EA |
| 3,560,661 | 2/1971 | Kobus et al. | 179/18 ET |
| 3,591,726 | 7/1971 | Edström et al. | 179/18 ET |
| 3,673,338 | 6/1972 | Ekbergh et al. | 179/18 ET |
| 3,911,227 | 10/1975 | Lawrence et al. | 179/18 ET X |
| 3,996,425 | 12/1976 | Low et al. | 179/18 DA |
| 4,001,513 | 1/1977 | Naylor | 179/18 DA |
| 4,017,691 | 4/1977 | Altenburger | 179/18 ET |
| 4,032,890 | 6/1977 | Gilfillen et al. | 179/175.2 R X |

Primary Examiner—Thomas W. Brown
Attorney, Agent, or Firm—Jerry W. Herndon

[57] ABSTRACT

The invention is a method and structure for use in a telephone office to translate equipment numbers of prescribed stations served by the office into their associated directory numbers. The method comprises the steps of scanning terminating calls in the office to obtain equipment numbers and the dialed directory numbers of called stations, comparing the equipment numbers of the called stations with the equipment numbers of the prescribed stations, and associating ones of the directory numbers with ones of the prescribed stations whose equipment numbers match the equipment numbers generated by the office during the terminating calls. As used in a preferred exemplary embodiment, the equipment numbers of the prescribed stations are generated by performing the additional step of scanning originating calls in the office to obtain the equipment numbers of stations originating calls of a prescribed type and compiling a list of the equipment numbers so obtained.

9 Claims, 6 Drawing Figures

STATION EQUIPMENT NO. TABLES

DIRECTORY NUMBER TABLES

FIG. 6

CALL TYPE, TONE SIGNALING AND DIAL PULSE SCAN INFO

| SCAN | MARKER RELAY DESIGNATION | DESCRIPTION | REFERENCE |
|---|---|---|---|
| SCAN 7 | SOG | OUTGOING CALL | U.S. PATENT 2,585,904 FIG. 93, 115, & 128 |
|  | ITR | INTRA-OFFICE CALL | " |
|  | TER | TERMINATING CALL | " |
|  | D | DIAL PULSE CALL | FIG. 94 |
|  | MF | TONE SIGNALED CALL | FIG. 94 |

ORIGINATING CALL SCAN INFO

| SCAN | MARKER RELAY DESIGNATION | DESCRIPTION | REFERENCE |
|---|---|---|---|
| SCAN 1 | FT 0-3 | FRAME TENS | U.S. PATENT 2,585,904 FIG. 33 |
|  | FU 0,1,2,4,7 | FRAME UNITS | FIG. 34 |
|  | VG 0,1,2,4,7,10 | VERTICAL GROUP | FIG. 34 |
|  | HG 0,1,2,4,7 | HORIZONTAL GROUP | FIG. 35 |
|  | VF 0-4 | VERTICAL FILE | FIG. 35 |
| SCAN 6 | TP | TIP PARTY STATION | FIG. 157 |
|  | RP | RING PARTY STATION | FIG. 157 |

TERMINATING CALL SCAN INFO

| SCAN | MARKER RELAY DESIGNATION | DESCRIPTION | REFERENCE |
|---|---|---|---|
| SCAN 3 | HGT 0-9 | HORIZONTAL GRP TEST | U.S. PATENT 2,585,904 - FIG. 29, 45 |
|  | VFT 0-4 | VERTICAL FILE TEST | FIG. 31 |
|  | RCT 10 | RING COMBINATION TEST (PBX) | FIG. 188 |
|  | OA | OFFICE A-4 DIGITS INCOMING | FIG. 132 |
|  | OB | OFFICE B-4 DIGITS INCOMING | FIG. 132 |
|  | ITC 0-9 | INCOMING TRUNK CLASS |  |
|  | LT | LOCAL TRANSLATION |  |
|  | 2DT | 6 DIGITS INCOMING |  |
|  | FVD | 5 DIGITS INCOMING |  |
| SCAN 4 | FTT 0-5 | FRAME TENS TEST | FIG. 48 |
|  | FUT 0-9 | FRAME UNITS TEST | FIG. 49 |
|  | VGT 0-11 | VERT. GROUP TEST | FIG. 26, 42 |
| SCAN 5 | RS 0,1 | RINGING SELECTION - TERM STATION TIP OR RING | FIG. 187 |
| SCAN 2 | CS- | TERM STATION CLASS OF SERVICE - WHETHER MULTIPLE PARTY SERVICE | FIG. 52 |
| SCAN 8 | G 0,1,2,4,7 | G DIGIT | U.S. PATENT 2,508,053 - FIG. 31 |
| SCAN 1 | A 0,1,2,4,7 | A DIGIT | FIG. 22 |
|  | B " | B " | FIG. 29 |
|  | C " | C " | " |
|  | D " | D " | " |
|  | E " | E " | FIG. 31 |
|  | F " | F " | " |
|  | RI " | INTERCEPT FLAG | FIG. 200 |
|  | TBI " | " | " |
|  | BN " | " | " |

ARRANGEMENT FOR TRANSLATING TELEPHONE STATION EQUIPMENT NUMBERS INTO DIRECTORY NUMBERS

TECHNICAL FIELD

The invention relates generally to telephone station equipment number and directory number translation arrangements and fraud detection in telephone systems and, in a preferred exemplary embodiment, the application of such arrangements to the detection and identification of unauthorized multifrequency signaling stations.

BACKGROUND OF THE INVENTION

When push-button tone station signaling service, such as TOUCH-TONE (registered service-mark of American Telephone and Telegraph Company) service, was first introduced to telephone subscribers, the demand for the service was insufficient to justify economically the provision of tone digit signal receiving circuitry and dial pulse circuitry in all of the originating call circuits of telephone offices. The problem was solved by providing two types of equipments, one to process dial pulses and the other to process tone digit signals and dial pulses. The two types of equipment were segregated by equipment locations in an office and dial pulse and tone signaling stations were assigned to the proper equipment locations in accordance with their authorized service. This, in one sense, was advantageous because it prevented a customer who had not subscribed to tone signaling service from installing an unauthorized tone signaling station and fraudulently using the service without paying for it.

As the demand for tone signaling service grew, however, the administrative and office equipment assignment tasks necessary to maintain segregation of the dial pulse and tone signal circuits became increasingly burdensome. It soon became evident that the practical solution to the problem was the provision of universal equipment which would operate both with dial pulse and tone signals. The result of this, however, is that subscribers served by certain telephone offices are able to defraud telephone companies by subscribing to dial pulse service while deriving the benefits of tone signaling service by installing their own tone signaling telepone stations.

The solution to the problem of preventing such fraud in offices that are vulnerable has been particularly elusive. Several schemes considered in the past directed toward blocking fraudulent tone signaled calls each involved the provision of some "class of dialing" indication which, of course, imposed some form of equipment or station assignment restriction and defeated the purpose of providing universal circuits. Other solutions involved extensive circuit modifications and proved too expensive to be justifiable. More recently, a proposed solution has been investigated which involves only the identification of stations from which tone signaled calls are placed, as opposed to blocking of the cells, and the subsequent verification, off-line, that the stations are authorized for such service. The major problem with this solution, however, is that in offices vulnerable to fraud, the only station identification available during originating calls are station equipment numbers, usually called line equipment numbers, which are generated by an office during call handling and which have no relationship to station directory numbers except via office cross-connections which are documented in office records. Service records identifying the services to which subscribers are entitled, on the other hand, are most conveniently maintained on a directory number basis. This solution thus contemplates the cumbersome steps of storing equipment numbers of stations from which tone signaled calls are placed, subsequently translating the station equipment numbers into directory numbers by means of office records and finally, searching station service records by directory number to verify whether or not the stations are authorized for tone signaling service.

Thus, a need exists for a simple and inexpensive method and structure for translating equipment numbers into directory numbers on certain types of originating calls.

SUMMARY OF THE INVENTION

The invention solves the problem of providing a convenient and inexpensive method and structure for translating equipment numbers of prescribed ones of the stations served by an office into the associated station directory numbers.

The method comprises the steps of scanning terminating call data in the office to obtain equipment numbers generated by the office and the dialed directory numbers of called stations, comparing the equipment numbers of the called stations with the equipment numbers of the prescribed ones of the stations, and associating ones of the directory numbers with ones of the prescribed stations whose equipment numbers match the equipment number generated by the office during the terminating calls.

As used in a preferred exemplary embodiment, the equipment numbers of the prescribed ones of the stations are generated by performing the additional step of scanning originating call data in the office to obtain the equipment numbers of ones of the stations originating calls of a prescribed type and compiling a list of the equipment numbers so obtained.

BRIEF DESCRIPTION OF THE DRAWING

In the drawing,

FIG. 6 is a table of scan commands executed by the computer along with references to completing marker relays whose states are interrogated by execution of the scan commands, by means of which the computer scans call data.

DETAILED DESCRIPTION

Figure 1:
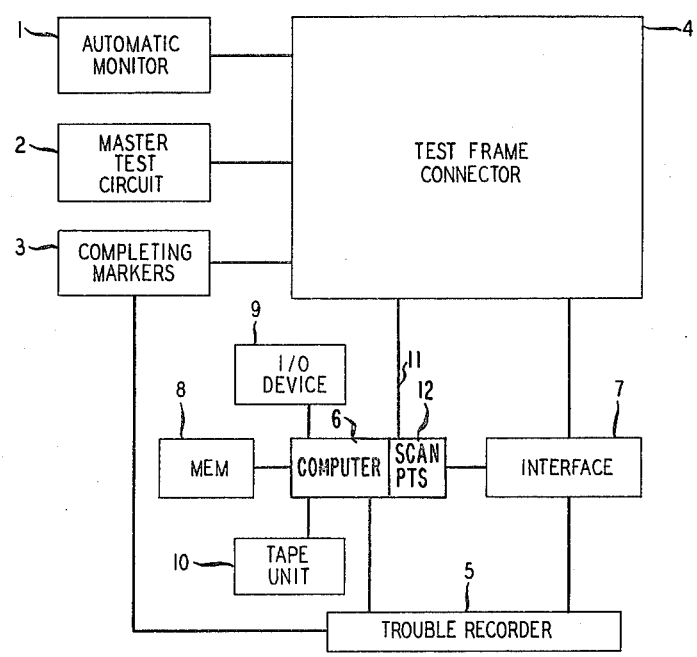
FIG. 1 is a block diagram of certain equipment in a typical telephone switching office, including markers, a test frame connector and trouble recorder, and also including a computer system and interface circuit by means of which calls in the office may be scanned.

The circuits of FIG. 1 disclose one environment in which our invention may advantageously be practiced. The circuits are illustratively contained in a No. 5 crossbar type of telephone office, such as manufactured by Western Electric Company, Incorporated. This type of office is described in detail in U.S. Pat. No. 2,585,904, which issued to Busch on Feb. 19, 1952. In conventional operation, a test frame connector (TFC) 4 operates in response to office trouble conditions or routine testing operations to connect an automatic monitor 1, master test circuit 2, or one of a plurality of completing markers 3, to a trouble recorder 5, to record on punched cards call data that aids office personnel in detecting, identifying and correcting fault conditions.

Ordinarily, automatic monitor 1, master test circuit 2, and each of markers 3 compete with each other for access to TFC 4. For example, if one of the markers 3 encounters excessive delay in completing a call, it bids for access to TFC 4 and when access is gained, TFC 4 cuts-through preselected leads from the marker to recorder 5. The recorder, in turn, punches a trouble ticket with the data from the marker leads.

Additional details of the operation of these circuits are disclosed in U.S. Pat. No. 2,508,053, which issued on May 16, 1950 to J. W. Dehn et al.

Computer 6 and interface 7 are improvements to the above arrangement and, as described in U.S. Pat. No. 4,032,890, which issued to L. R. Gilfillen et al. on June 28, 1977, allow trouble data from office circuits to be accumulated and analyzed automatically in lieu of producing individual trouble tickets from recorder 5. Interface 7 is installed permanently in an office along with TFC 4 and recorder 5, and plug-in connections are provided for computer 6 which may then be installed permanently or temporarily as the need arises.

In addition to trouble data accumulation, as described in the Gilfillen et al. patent, computer 6 and interface 7 provide an operational mode in which access may be gained through TFC 4 to circuit leads of, say, any one of the markers 3 for scanning call data in the office pertaining to calls which are not encountering trouble. Circuits to which access has been so gained are said to be specially seized. As will be seen, we use this mode of operation to detect unauthorized tone signaling telephone stations and to identify these stations by translating their station equipment numbers into the associated directory numbers.

The operation of computer 6 and interface 7 in accumulating call data is described in detail in the Gilfillen et al. patent and only sufficient information is presented here for an understanding of our invention. The patent disclosure is hereby incorporated into this specification by reference.

Briefly, computer 6 and interface 7 operate to gather call data as follows. Computer 6 is equipped with a plurality of signal distribute points whereby it may control the operations of relays in TFC 4 and interface 7. Computer 6 is also equipped with a plurality of scan points 12 which it uses to monitor the states of such relays and the states of relays of markers 3, leads from which are cut-through by TFC 4. Interface 7 contains circuitry operated by computer 6 to control the cut-through relays in TFC 4.

In order to gather call data in the office, computer 6 performs special seizures of the markers 3 and scans the states of leads from the seized markers. To affect such a special seizure, computer 6 controls interface 7 by means of a distribute point to gain access to TFC 4. In actual practice, computer 6 first determines, by means of a scan point from TFC 4, that it is available to be seized before attempting the special seizure. Computer 6 is therefore assured of success in its bid for seizure. This process is explained fully in the Gilfillen patent.

In response to a successful special seizure of TFC 4, interface 7 cuts-through control connections from computer 6 to TFC 4. Computer 6 then operates via distribute points associated with these connections a desired pair of marker connector relays in TFC 4 to select the desired marker to be scanned. Computer 6 may now operate any one of a plurality of scan relays in TFC 4 to select and cut-through to ones of the scan points 12 of computer 6 the desired leads in the marker to be scanned. These last distribute operations from computer 6 are referred to herein as scan commands and are identified in FIG. 6 herein as SCAN1 to SCAN8. These scan commands correspond to distribute signals appearing on respective ones of the leads S1 to S8 in FIG. 5 of the Gilfillen patent. As described in Gilfillen, each scan command cuts-through up to 120 different leads from the selected marker and applies the signals thereon to leads BW0 to BW119 in FIG. 8 of the patent. These leads are returned to ones of the scan points 12 of computer 6. The specific sequences of scan commands executed by computer 6 and the data monitored thereby is described more fully hereinafter.

The above briefly described computer and interface system is used as now described to detect unauthorized tone signaling stations and, in particular, to identify these stations by translating their equipment numbers generated by the serving office into their respective station directory numbers. A list of directory numbers of stations authorized for tone signaling service, compiled from station service records, is prepared on magnetic tape and inputted into memory 8 of computer 6. Call data scanning operations are then performed over a continuous period sufficient in length to obtain call data pertaining to at least one originating call from and one terminating call to almost all of the stations served by the office. About a two-week period of operation appears sufficient to obtain data on about 95% of the stations. For scanning operations pertaining to originating calls, a list is compiled of station equipment numbers of stations that have originated a tone signaled call. For scanning operations pertaining to terminating calls, the equipment numbers of the called stations are compared to the list compiled during the scanning of originating calls. If a station equipment number appears on the list, the dialed number of the called station received by the office is used to consult the list of authorized directory numbers. If the station is not authorized, its directory number does not appear on the list of authorized stations and, in that event, the directory number is added to another list of stations that have originated an unauthorized tone signaled call.

During the period of call data scanning operations, there is continuous service order activity, i.e., installing new stations, changing directory numbers. and the like, that render the station authorization data inputted prior to the scanning operations partially obsolete. The result is that a few tone signaling stations may improperly be labeled by the program as unauthorized. This problem is solved by subsequently compiling a new magnetic tape listing of authorized stations, accurate to the date of termination of scanning operations, and by modifying the fnal program results in accordance with the new data.

Figure 3:
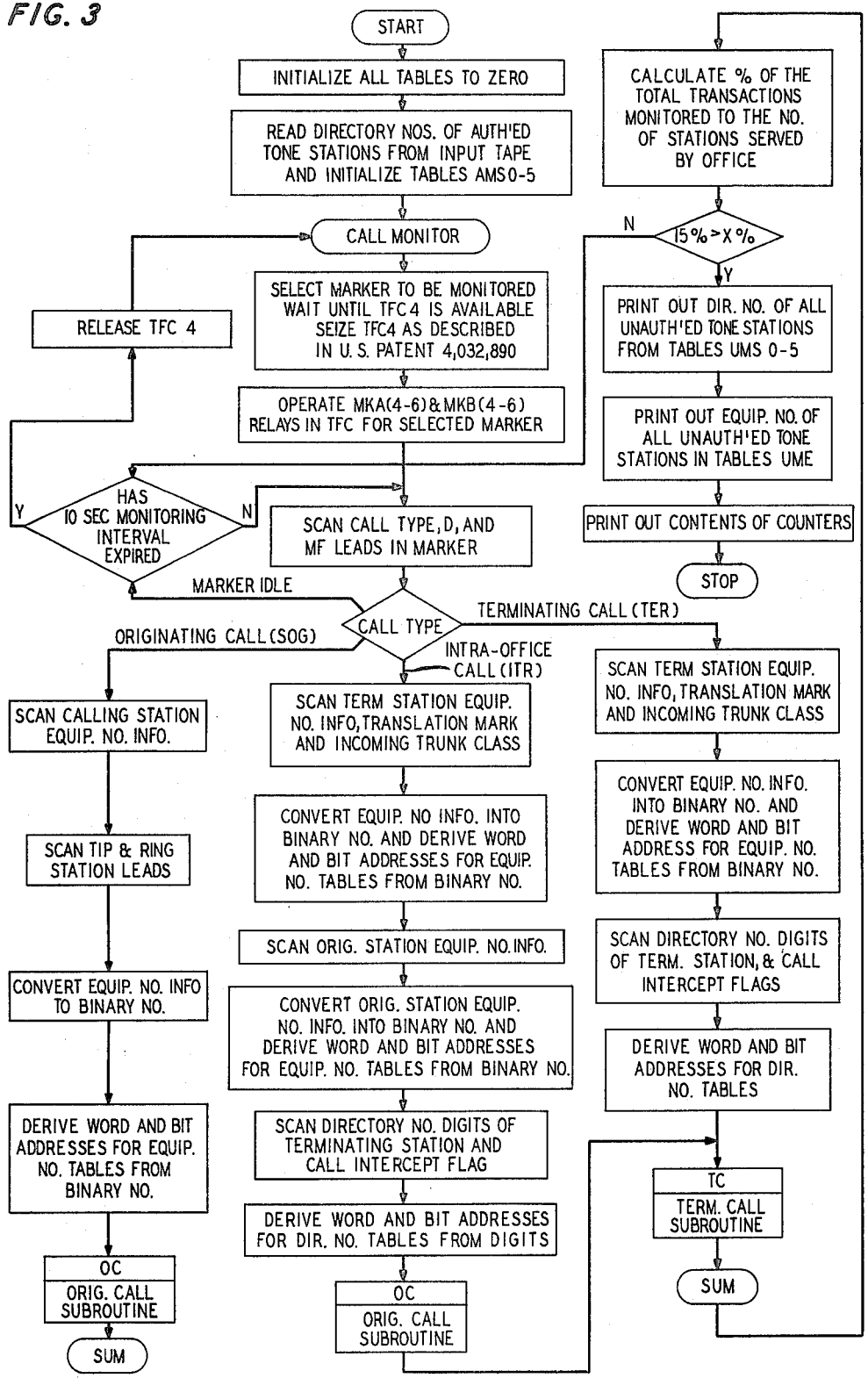
FIG. 3 discloses a flowchart of a control program for the computer.

In more detail now, the computer 6 control program shown in FIG. 3 repetitively controls computer 6 to effect special seizures of each of the markers of the office according to a prescribed algorithm and determines from data obtained from each seized marker if it is busy and, if so, whether it is processing an originating or terminating call.

If a seized marker is processing an originating call, computer 6 scans information from the marker identifying the equipment number in the office associated with the originating station. It also obtains information received by the marker from an originating register serving the call specifying whether dial pulses or tone signaling was used. As originating calls are scanned, a table in memory 8, arranged by station equipment number, is compiled specifying each station that has made a tone signaled call. If a terminating call has been scanned to the station before this originating call from the station, it may be understood that it is possible, at this time, to identify the station by directory number and determine if the station is authorized for tone signaling service. This requires storing the directory numbers of called stations obtained during the scanning of terminating calls in a manner associated with the corresponding station equipment numbers so that the directory numbers are available during the scanning of originating calls. This technique, however, requires extensive memory space, which may be limited. In the preferred embodiment, only indications, associated with station equipment numbers, are stored by the terminating call scanning portion of the program indicating that called stations are authorized for tone signaling service. The originating call scanning portion of the program uses these indications to compile a separate table of equipment numbers of stations that have originated unauthorized tone signaled calls. In the event no subsequent terminating call is scanned to these stations, the separate table of unauthorized station equipment numbers at least flags the stations as being unauthorized. The directory numbers of these stations may subsequently be obtained manually be reference to office and billing records.

Assuming now, that a scanned call is a terminating call, the program obtains data from the seized marker specifying the equipment number and the dialed digits (directory number) of a called station. The program determines from the list of directory numbers of authorized tone signaling stations whether or not this particular called station is so authorized. If an originating tone signaled call has previously been scanned from the station and the station is not so authorized, the terminating call portion of the program adds the directory number of the station to a list of unauthorized stations. If the called station is not authorized to use tone signaling and an originating call from the station has not yet been scanned, or not scanned while originating a tone signaled call, an indication of the unauthorized status of the station, discussed above, is set for the originating call portion of the program.

Figure 2:
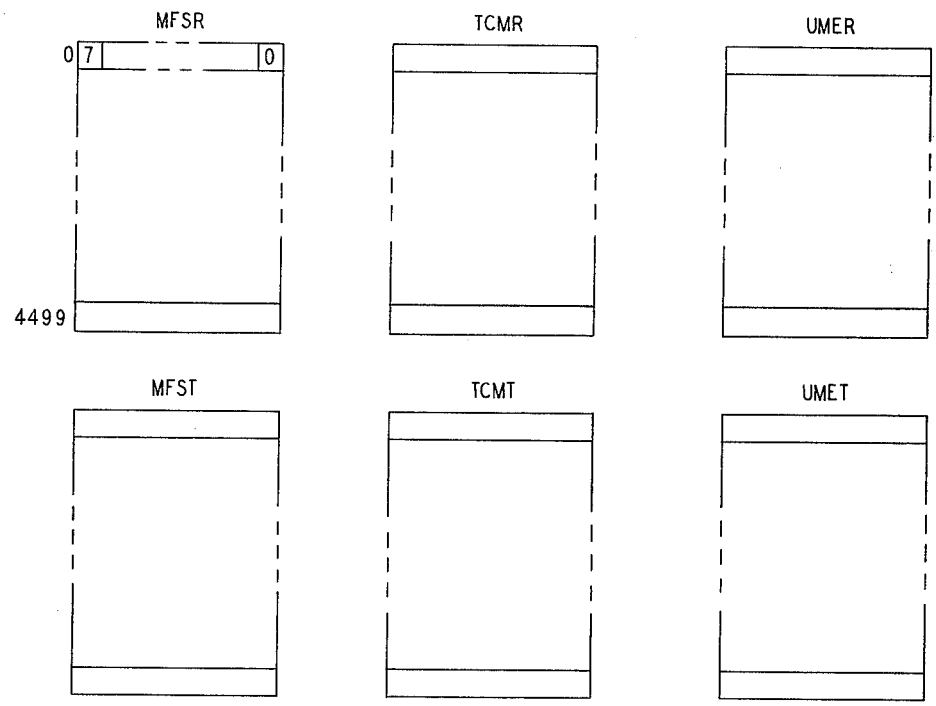
FIG. 2 discloses a plurality of data tables which may be located in the memory associated with the computer and into which station input parameter data is stored as well as other data pertaining to stations from and to calls which have been scanned by the computer.
Figure 2:
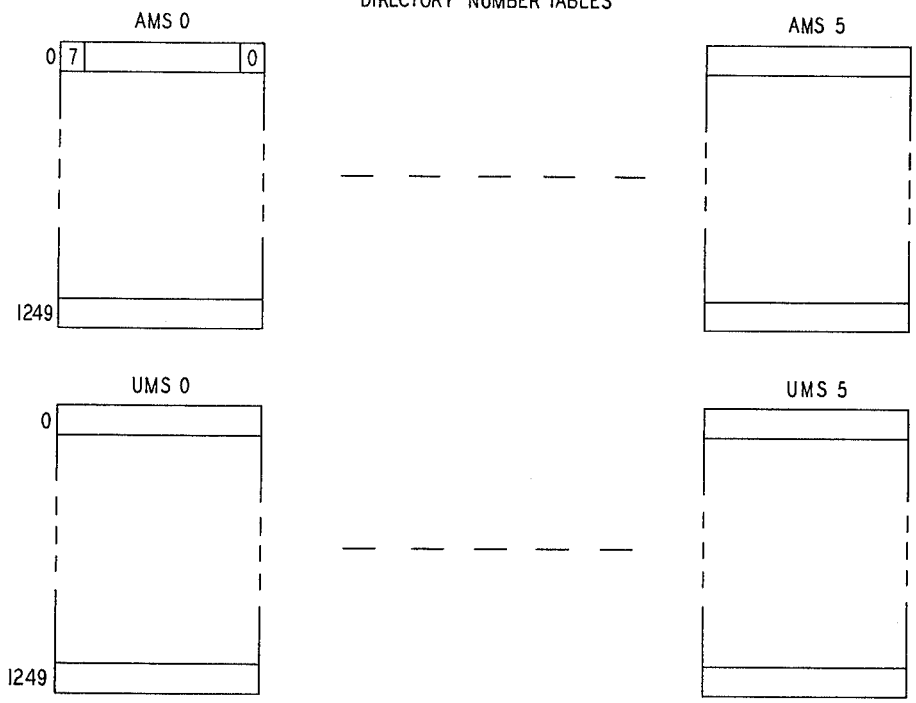

FIG. 2 shows the tables which are used to accumulate the required data for each station in memory 8. Two types of tables are shown, those identified as station equipment number tables and associated primarily with the originating call program, and those identified as directory number tables and associated primarily with the terminating call program. The tables and the type of data accumulated by each are as follows:

MFSR—equipment number listing of ring party stations that have originated a MF call;
MFST—equipment number listing of tip party stations that have originated a tone signaling call;
TCMR—equipment number listing of ring party stations for which a terminating call has been scanned;
TCMT—equipment number listing of tip party stations for which a terminating call has been scanned;
UMER—equipment number listing of ring party tone signaling stations that have been determined to be unauthorized, but for which directory number translation has not yet been obtained;
UMET—equipment number listing of tip party tone signaling stations that have been determined to be unauthorized, but for which directory number translation has not yet been obtained;
AMS0 to AMS5—directory number listing of authorized tone signaling stations;
UMS0 to UMS5—directory number listing of tone signaling stations determined to be unauthorized.

Figure 4:
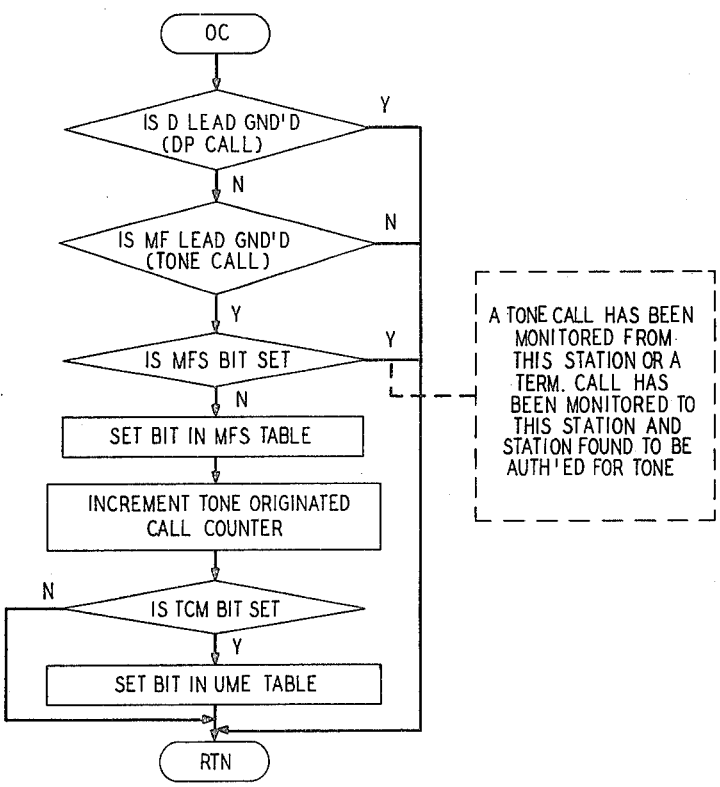
FIGS. 4 and 5 disclose flowcharts of program subroutines called by the control program.
Figure 5:
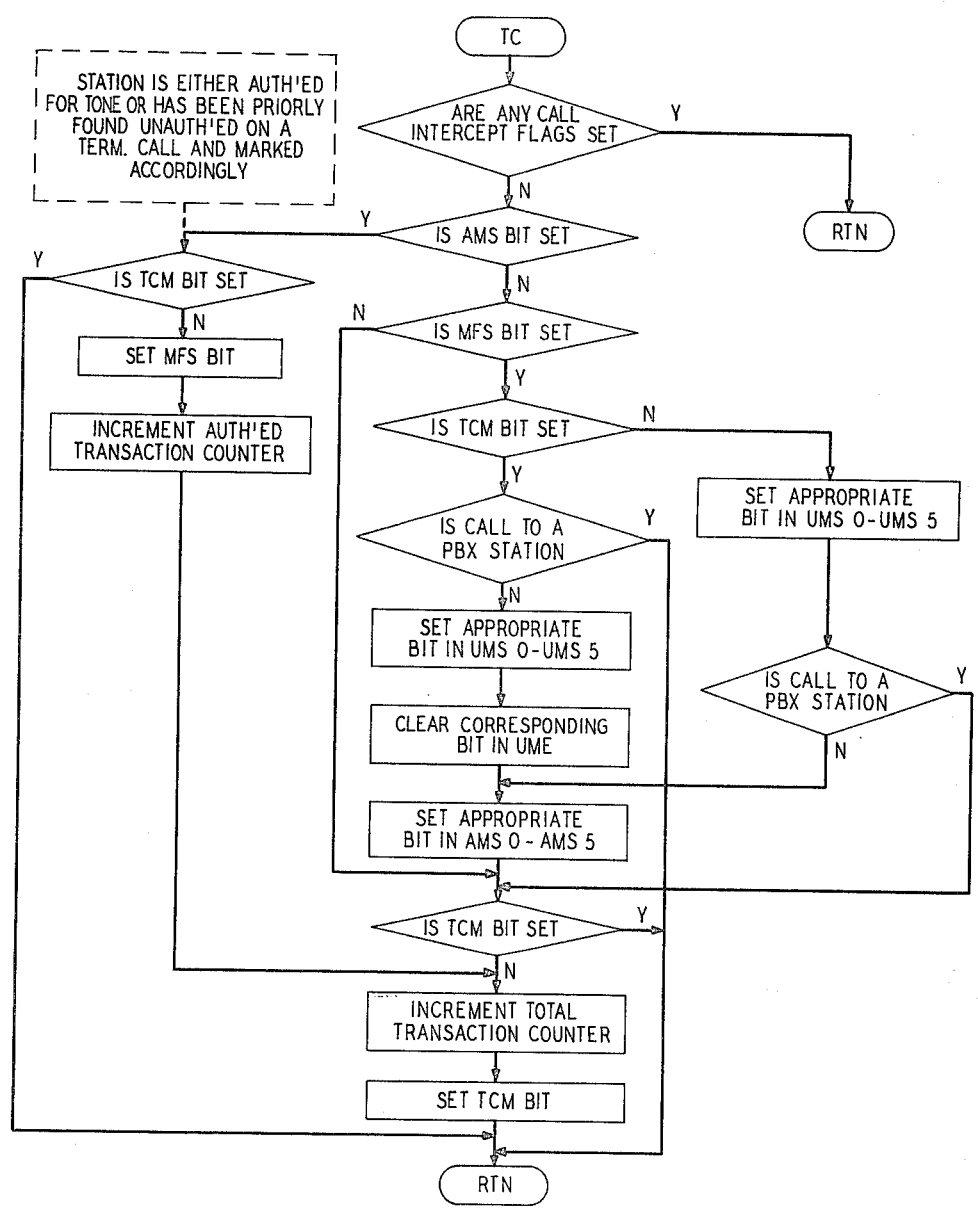

The station equipment number tables are divided into two types according to ring party and tip party stations as shown above. In the flowcharts of FIGS. 3, 4 and 5, to be discussed later, this distinction is ignored for simplicity. Thus, a reference in the flowchart may be, for example, to table MFS, it being understood that this means the appropriate one of tables MFSR or MFST as determined by the ring or tip party designation. The directory number tables, on the other hand, are divided according to the office codes of the stations. The reader may understand, as explained in the Busch U.S. Pat. No. 2,585,904, that a single office entity may actually serve up to six office codes. These codes are specified by the digits XXX in a directory number having the format XXX-YYYY (preceding digits specifying the area code of an office are ignored). The tables AMS0 to AMS5 are individually associated with a different one of the six possible office codes of an office. UMS0 to UMS5 are also likewise associated. Each of the directory number tables AMS0 to AMS5 and UMS0 to UMS5 to illustratively formatted to contain 10,000 bits corresponding to the maximum number of directory numbers that may be contained in each office code of a No. 5 crossbar type of office. The tables are assumed for illustration to contain 1250 words of 8 bits each. Each single bit is arranged in numerical order according to the word number of the table and bit location of the word corresponding to the directory number of a station. For example, bit 0 of word 0 of AMS0 is associated with a station having an office code associated with AMS0 and the directory number of 0000. Bit 7 of word 1 of AMS0 is associated with a station of the same office code whose directory number is 0015.

The station equipment number tables have a similar format except that each table illustratively has 36,000 bits corresponding to a maximum of 36,000 possible equipment numbers and the individual bits are associated with equipment numbers instead of directory numbers. In order to generate word and bit position addresses in these tables for any given station, the equipment number of the station, which is composed of plural groups of coded binary data, is converted into a unique artificial binary number in the group of numbers from 0 to 35,999. This conversion may be performed according to any of several algorithms and this binary number is then treated much like a directory number to identify one bit in the appropriate table that artifically identifies the station by equipment number.

A flowchart of the control program of computer 6 is shown in FIG. 3. Execution of the program is begun at address START in FIG. 3 in response to a command inputted by means of I/O device 9. Before scanning operations are begun, however, the number of markers in the office and the assignments of the marker leads to be scanned, as identified in FIG. 6, to the BW0 to BW119 leads shown in FIG. 8 of the Gilfillen patent are specified to computer 6. This latter step is required because the lead assignments may vary from office to office. These identifications are inputted to computer 6 preferably by input message from I/O unit 9. The tape containing the directory numbers of stations authorized for tone signaling service is also loaded on tape unit 10. The program first initializes the tables of FIG. 2 and other scratch memory to the "zero" state. The program then reads the directory numbers of authorized stations from the tape and sets the appropriate bits identifying these stations in the tables AMS0 to AMS5.

At program address CALL MONITOR, the program selects a marker of the office to be scanned. This selection can be made according to any desired algorithm; a preferred algorithm is simply to select sequentially and repetitively each of the markers in the office and to monitor the calls processed by each selected marker for a predetermined period of time. After selecting a marker, the program determines if TFC 4 is available to be specially seizured. This is accomplished by means of a scan point in computer 6 which monitors an idle/busy status lead in cable 11 from TFC 4. In the event another office circuit, such as the master test circuit 2, or a marker, has already accessed TFC 4, the program merely waits until TFC 4 is available, at which time it effects a special seizure thereof as described in U.S. Pat. No. 4,032,890. That the seizure was effective is verified by means of other scan points connected to leads of cable 11. The program now operates a pair of marker connector relays MKA(4–6) and MKB(4–6) located in TFC 4 and shown in FIG. 4 of U.S. Pat. No. 4,032,890, which identify the selected marker. The operation of these marker connector relays appears to TFC 4 to manifest a normal seizure of it by the selected marker such as would occur in a trouble condition. This results in the operation of a number of auxiliary cut-through relays to extend lead connections from the marker to other access points in TFC 4. The program now proceeds to operate pairs of scan relays S-(5-4)(−) and R-(5-4)(−), shown in FIG. 5 of the patent to cut-through desired ones of the access points to scan points of computer 6 via data leads in cable 11.

FIG. 6 identifies the various scan commands that are performed by computer 6 to operate the desired scan relays.

With reference both to FIGS. 3 and 6, the program first executes a SCAN7 distribute command to TFC 4 to cut-through leads SOG, ITR and TER defining the call type of a call currently being processed by the marker, if any, and leads D and MF specifying on an originating call whether dial pulsing or tone signaling is used. A signal on one of the leads, SOG, ITR and TER indicate, respectively, that an outgoing call, intraoffice call or terminating call is being processed by the marker. If no signal is present on any of the call type leads, the marker is idle. In any event, the control program monitors the call operations of the selected marker for a predetermined time interval which is here illustratively 10 seconds, and at the end of that interval, it selects and scans the operations of the next marker in the selection sequence.

Assuming that an outgoing type of originating call is in progress (signal on lead SOG), the program executes a SCAN1 distribute command to cut-through frame tens, frame units, vertical group, horizontal group and vertical file leads shown in FIG. 6 defining, in coded format, the equipment number of the originating station. The program also executes a SCAN6 distribute command which cuts-through leads TP and RP as shown in FIG. 6 defining whether the originating station is a tip or ring party station. The groups of leads defining the equipment number are converted into a unique binary number in the range 0 to 35,999, as mentioned above. The binary number is then converted into word and bit location addresses of the equipment number tables shown in FIG. 2. The signals from leads TP and RP determine whether the ring or tip tables of the equipment number tables are to be used. The program then calls the originating call subroutine OC, shown in FIG. 4.

Subroutine OC examines the signals obtained from the D and MF leads of the marker to determine whether the call was originated with dial pulsing or tone signaling. If dial pulsing was used, there is no further interest in this call. OC, therefore, merely returns to the control program. If tone signaling was used, subroutine OC examines the appropriate bit of the appropriate one of tables MFSR or MFST. If the examined bit is set in MFSR (or MFST) a tone signaled call has already been scanned from this station or, as will be described later, a terminating call has been previously scanned to this station and the station found to be authorized to place tone signaled calls. If this is the case, subroutine OC need take no further action and it returns to the control program. Otherwise, subroutine OC sets the appropriate bit in the MFSR (or MFST) table, indicating that a tone signaled call from this station has been scanned, and increments a counter (not shown) tabulating the number of different stations which have placed such a scanned call.

If a terminating call has previously been scanned to this originating station, it may now be determined whether or not the station is authorized for tone signaling. The above mentioned indication, stored by the terminating call subroutine, which allows this determination, consists of a prescribed state of corresponding bits pertaining to this station in tables MFSR (or MFST) and TCMR (or TCMT). As will be seen, if a terminating call has been previously scanned, TCMR (or TCMT) will be set. If the station is authorized for tone signaling, the terminating call subroutine will also have set MFSR (or MFST). The MFSR or (MFST) bit has already been found to be not set by OC. Accordingly, subroutine OC next interrogates the appropriate bit in table TCMR (or TCMT) and if it is set, the station is unauthorized to originate the tone signaled call now in progress. In this case, a bit is set in table UMER (or UMET) identifying the station on the basis of equipment number as an unauthorized station. As will be seen, this bit will be cleared and a bit set in one of tables UMS0 to UMS5 identifying the station by directory number in the event another terminating call to the station is later scanned.

With reference again to FIG. 3, if a terminating call is being processed by the selected marker (signal on lead TER), the program obtains from the marker the equipment number of the terminating station and the called directory number digits of the station. The program performs this by first executing a SCAN3 command shown in FIG. 6 to obtain horizontal group and vertical file information of the equipment number on leads HGT0-9 and VFT0-4. Also obtained on this scan is a ring combination indication on lead RCT10, which determines if the call is to a private branch exchange (PBX) station, and digit translation information on leads OA (office A), OB (office B), ITC0-9 (incoming trunk class), LT (local translation), 2DT and FVD. Without going into excessive detail on information that is otherwise readily available, the OA, OB, ITC0-9, LT, 2DT and FVD signals are used in conjunction with the dialed digits, which are scanned as described below, as follows. If 7 directory number digits ABC-EFGH identifying the called station are incoming, a signal on LT is present, in which case the program uses the A, B and C office code digits to determine the appropriate one of the directory number tables AMS0 to AMS5 and UMS0 to UMS5. Similarly, if 6 digits or 5 digits are incoming, a signal is present on 2DT or FVD, respectively. In the event of six incoming digits (signal on 2DT), digits A and B are used to determine the appropriate directory number table. Only digit A is used for this purpose if 5 digits are incoming (signal on lead FVD). If a signal is present on either OA or OB, 4 digits are incoming. An OA signal identifies one-half of the office codes and an OB signal identifies the other half. The signals on leads ITC0-9 determine the specific office code of the half defined by OA and OB and thus the appropriate one of the directory number tables.

Next, the program executes a SCAN4 command to obtain frame tens, frame units and vertical group equipment number information from leads FTT0-5, FUT0-9 and VGT0-11. A SCAN5 command is next executed to obtain terminating station tip or ring information on ringing selection leads RS0 and RS1. A SCAN2 command is executed to obtain a class of service mark on one of the class of service leads CS-. This lead determines whether or not the terminating station has multiple party service. This, in turn, determines whether or not the ringing selection information obtained above is required to determine whether the called station is a tip or ring party station. The particular CS- lead that must be scanned varies in different offices and must be specified to the program before program execution.

The horizontal group, vertical file, frame tens, frame units and vertical group information are converted by the program into the unique binary number artifically identifying the station equipment number as was discussed in reference to the originating call subroutine. This binary number is likewise converted into word and bit addresses for the equipment number tables. The class of service and ringing selection information is used to determine whether the ring or tip tables of the equipment number tables are to be used for the called station.

The program next executes a SCAN 8 command to obtain to G digit of the called station directory number. This is followed by a SCAN1 command to obtain the A through F digits. The SCAN1 command also obtains call intercept flags on leads RI, TBI and BN, one of which has a signal thereon in the event the call is intercepted. As will be seen, any intercepted call will be ignored for monitoring purposes.

The program derives directory number table word and bit addresses for this called station from the last four digits of the dialed number. The program now calls the terminating call subroutine TC.

Subroutine TC, shown in FIG. 5, first determines whether any of the call intercept flags are activated. If so, the subroutine ignores this call and merely returns to the control program to monitor a new call. Assuming that the monitored call has not been intercepted, however, the derived word and bit location addresses of the directory number tables are used to interrogate the appropriate bit in one of tables AMS0 to AMS5 to determine if the called station is authorized to place tone signaled calls. If the bit is set, the station is so authorized or, as will be seen, a terminating call to this station has already been scanned and the station found to be unauthorized and marked accordingly in one of the tables UMS0 to UMS5. In the latter case, the appropriate bit in table TCMR (or TCMT) will have been set and, in this event, subroutine TC merely returns to the control program.

If the appropriate bit in ASM0-AMS5 is set and the TCMR (or TCMT) bit is not set, this is the first terminating call scanned to this authorized station and, in this event, subroutine TC sets the appropriate bit in table MFSR (or MFST) associated with the station to cause subroutine OC to ignore subsequent originating calls from the station. This is done to save unnecessary work since the station is now known to be authorized. In addition, subroutine TC increments a counter (not shown) so that information is available as to the number of authorized stations for which terminating calls have been scanned. A total transaction counter (not shown) is also incremented to indicate the total number of stations for which terminating calls have been scanned. The total transaction counter information is used, as will be seen, to determine when scanning operations should be terminated. Finally, the TCMR (or TCMT) bit in the equipment number tables is set to indicate that a terminating call to this station has been scanned.

If the appropriate bit in tables AMS0 to AMS5 is not set at the beginning of execution of subroutine TC, the station is not authorized for tone signaling. However, if the MFSR (or MFST) bit is also not set, a tone signaled originating call from this station has not yet been scanned and no further determination can be made at this time. In this case, subroutine TC increments the total transaction counter if this is the first terminating call scanned to this station (TCMR or TCMT not set), sets the TCMR (or TCMT) bit and returns to the control program. If the MFSR (or MFST) bit is set, however, a tone signaled call now known to be unauthorized has been previously scanned from this station. The actions that now occur depend upon whether the terminating station is a PBX station. In general, when a terminating call is scanned to an unauthorized station for which an originating call has also been scanned, the station is made to appear authorized by setting the appropriate bit in tables AMS0 to AMS5. This prevents subsequent program actions for those stations for which translation results have been obtained. In PBX stations, however, in which a plurality of stations are associated with the same directory number, it is undesirable to mark artificially any station as authorized in the directory number tables because this would prevent monitoring of the bulk of the stations in the PBX. With reference again to FIG. 5 then, if the call now being scanned is the first scanned terminating call to the station (TCMR or TCMT not set), subroutine TC sets the appropriate bit in the unauthorized MF station table UMS0 to UMS5 and then determines, by interrogating the state of the marker ring combination test lead RCT10, whether or not the call is to a PBX station. If the call is not to a PBX station, the appropriate bit in one of tables AMS0 to AMS5 is set to make the station subsequently appear to be authorized. If the call is to a PBX station, this step is omitted.

If the appropriate AMS bit is not set and the MFS and TCM bits are set, a terminating call has been priorly scanned to the called station to which a call is again being scanned. At the time of the prior scan, the station had not yet been monitored originating a tone signaled call. The current set state of the MFS bit means that during the time between the prior scan and the current scan, the station has originated such an unauthorized call. If the station is not a PBX station as determined by a signal on RCT10, the appropriate bit is set in one of tables UMS0 to UMS5 to identify the directory number of the unauthorized station. A corresponding bit may also have been set in table UMER (or UMET), in this case identifying the station by equipment number as unauthorized. This bit is now cleared since identification by directory number has been obtained. If the called station is a PBX station, no further action is taken by TC. Otherwise, the appropriate bit is set in one of tables AMS0 to AMS5 to prevent future program action respecting this station by making it appear to be authorized.

With reference again to FIG. 3, it is assumed now than an intraoffice call is scanned as indicated by a signal on the marker lead ITR. Intraoffice calls, of course, have characteristics of both originating and terminating calls in that the call is originated by a station served by the office and directed to another station also served by the office. For this type of call, marker data for both originating and terminating calls is obtained by performing the appropriate scan commands as shown in FIG. 6 and by executing both subroutines OC and TC as shown in FIG. 3.

After the appropriate subroutines OC and TC have been executed for any call, the control program in FIG. 3 transfers to program address SUM. At SUM, a determination is made whether or not calls have been scanned to a sufficient number of stations to cease operations. A preferred way of accomplishing this, as shown by the flowchart of FIG. 3, is to calculate the percent of the number of different stations for which calls have been scanned, using the total transaction counter incremented in subroutine TC, to the total number of stations served by the office. The number of stations served by the office is an input parameter which is given to the program before execution. If the percentage is greater than some selected percentage X, the control program ceases operations.

At this point, several options are available to update the unauthorized station results stored in tables UMS0 to UMS5, which are likely to have errors due to service order activities that have occurred since scanning operations first began. A new tape of directory numbers of authorized tone signaling stations, accurate to the time that operations cease, may be inputted from tape unit 10 and used to clear the corresponding UMS0 to UMS5 table locations. Alternatively, the table results may be stored on output tape and processed in a similar fashion off-line. This is the option illustrated in FIG. 3. By storing the results on output tape, time is allowed for the leisurely generation of the updated tape or authorized directory numbers, accurate to the time that operations ceased. Thus, the program at SUM in FIG. 3 stores on tape the directory numbers from tables UMS0 to UMS5 of all unauthorized tone signaling stations that have been detected. Some unauthorized stations may be identified by equipment number only in tables UMER and UMET. The program also stores the binary representation of those equipment numbers of these stations from these tables. The corresponding directory numbers may be obtained by manually interrogating office records. The contents of the total transaction counter and the authorized transaction counter are also outputted and program execution is terminated.

It is understood that the herein described arrangements are illustrative of the application of principles of our invention. In light of this teaching, it is apparent that numerous other arrangements may be devised by those skilled in the art without departing from the spirit and scope of the invention.

We claim:

1. In a telephone office serving a plurality of telephone stations in which each station is associated with an equipment number generated by the office and a directory number, a method of translating a plurality of equipment numbers of prescribed ones of the stations into their associated directory numbers, CHARACTERIZED BY the steps of scanning terminating calls in the office directed to said stations to obtain the equipment numbers of the terminating stations and the associated directory numbers, comparing the equipment numbers obtained during the scanning of terminating calls to the equipment numbers of said prescribed ones of the stations, and associating ones of the directory numbers obtained during scanning of the terminating calls with ones of the prescribed stations whose equipment numbers match the equipment numbers obtained during scanning of the terminating calls.

2. The method of claim 1 wherein said plurality of equipment numbers of said prescribed ones of the stations is generated by the steps of scanning originating calls in the office to detect calls of a predetermined type and to obtain the equipment numbers of ones of the stations originating the predetermined type of call, and compiling a list of the equipment numbers of said ones of the stations originating the predetermined type of call.

3. In a telephone office serving a plurality of telephone stations in which each station is associated with an equipment number generated by the office and a directory number, a method of translating the equipment numbers of ones of the stations originating calls of a prescribed type into their respective directory numbers, said method being CHARACTERIZED BY the steps of scanning originating calls in the office to obtain the equipment numbers of said ones of the stations, storing representations of the equipment numbers so obtained, scanning terminating calls in the office to obtain the equipment numbers and the directory numbers of called stations, and examining the stored equipment number representations to determine whether the equipment numbers obtained during the scanning of terminating calls is therein represented, wherein in the event the equipment numbers are so represented, the directory numbers of the called stations identify said ones of the stations.

4. The method of claim 3 wherein the office comprises at least one call processing control unit (FIG. 1:3) and the originating call scanning step comprises the steps of accessing prescribed circuit leads to the control unit to identify originating calls of the prescribed type and to obtain the equipment numbers of the stations originating the prescribed type of call, and converting the equipment numbers so obtained into unique addresses of storage locations, and wherein the storing step comprises the step of setting each storage location identified by the addresses to a prescribed state.

5. The method of claim 4 wherein the terminating call scanning step comprises the steps of accessing circuit leads of the control unit to obtain the equipment numbers of the called stations, and converting the equipment numbers so obtained into said addresses, and wherein the examining step comprises the step of interrogating the storage locations identified by said last-mentioned addresses to ascertain if said prescribed states are present in the storage locations defined by said last-mentioned addresses.

6. The method of claim 3 further comprising the step of storing in a first memory (FIG. 2: AMS0–AMS5) directory number representations of ones of the stations authorized to originate calls of the prescribed type before initiating the originating the terminating call scanning steps, and wherein the step of storing representations of equipment numbers comprises storing in a second memory (FIG. 2: MFSR–MFST) as originating calls are scanned said equipment number representations of ones of the stations originating calls of the prescribed type, and wherein the terminating call scanning step further comprises storing in a third memory (FIG. 2: UMS0–UMS5) as terminating calls are scanned directory number representations of ones of the stations that are unauthorized to originate calls of the prescribed type according to information in the first memory and from which an originating call of the prescribed type has been scanned according to information in the second memory.

7. The method of claim 6 wherein the terminating call scanning step further comprises the step of storing in a fourth memory (FIG. 2: TCMR–TCMT) equipment number representations of stations to which a terminating call has been scanned, including indications of whether or not each such station is or is not authorized to originate the prescribed type of call, and wherein the originating call scanning step further comprises the step of storing in a fifth memory (FIG. 2: UMET and UMER) equipment number representations of the stations from which originating calls of the prescribed type have been scanned and which are not so authorized according to the indications.

8. The method of claim 7 wherein the terminating call scanning step further comprises removing the equipment number representations of ones of the stations in the fifth memory when the directory number representations of the last-mentioned ones of the stations are stored in the third memory.

9. The method of claim 3 wherein the office comprises a plurality of control units (FIG. 1:3) and said method further comprises the steps of selecting sequentially ones of the control units for call scanning according to a prescribed selection algorithm, accessing prescribed leads of a selected one of the control units to determine if it is processing an originating or terminating call, if any, and executing the originating and the terminating call scanning steps accordingly.

* * * * *